(12) United States Patent
Kohli et al.

(10) Patent No.: US 7,819,936 B2
(45) Date of Patent: Oct. 26, 2010

(54) FILTER FELTS AND BAG FILTERS COMPRISING BLENDS OF FIBERS DERIVED FROM DIAMINO DIPHENYL SULFONE AND HEAT RESISTANT FIBERS

(75) Inventors: Anil Kohli, Midlothian, VA (US); Kurt Hans Wyss, Bogis (SZ)

(73) Assignee: E.I. du Pont de Nemours and Company, Wilmington, DE (US)

( * ) Notice: Subject to any disclaimer, the term of this patent is extended or adjusted under 35 U.S.C. 154(b) by 142 days.

(21) Appl. No.: 11/894,976

(22) Filed: Aug. 22, 2007

(65) Prior Publication Data

US 2009/0049816 A1 Feb. 26, 2009

(51) Int. Cl.
*B01D 39/02* (2006.01)
*B01D 39/04* (2006.01)
*D04H 1/54* (2006.01)

(52) U.S. Cl. .............................. 55/527; 55/528; 442/411
(58) Field of Classification Search .................. 55/528, 55/527; 442/411
See application file for complete search history.

(56) References Cited

U.S. PATENT DOCUMENTS

| | | | |
|---|---|---|---|
| 2,910,763 A | 11/1959 | Lauterbach | |
| 3,047,455 A | 7/1962 | Holmes et al. | |
| 3,063,966 A | 11/1962 | Morgan et al. | |
| 3,227,793 A * | 1/1966 | Cipriani | 264/203 |
| 3,287,324 A | 11/1966 | Sweeny | |
| 3,414,645 A | 12/1968 | Morgan, Jr. | |
| 3,508,308 A | 4/1970 | Bunting, Jr. et al. | |
| 3,524,304 A | 8/1970 | Wittemeier et al. | |
| 3,597,301 A * | 8/1971 | Le Blanc et al. | 442/141 |
| 3,684,284 A | 8/1972 | Tranfield | |
| 3,767,756 A | 10/1973 | Blades | |
| 3,797,074 A | 3/1974 | Zafiroglu | |
| 3,803,453 A | 4/1974 | Hull | |
| 3,869,429 A | 3/1975 | Blades | |
| 3,869,430 A | 3/1975 | Blades | |
| 4,056,374 A | 11/1977 | Hixenbaugh | |
| 4,100,323 A | 7/1978 | Forsten | |
| 4,117,578 A | 10/1978 | Forsten | |
| 4,144,079 A * | 3/1979 | Smith | 106/162.6 |
| 4,169,932 A | 10/1979 | Sokolov et al. | |
| 4,202,962 A | 5/1980 | Bach | |
| 4,310,336 A | 1/1982 | Peterson | |
| 4,481,022 A | 11/1984 | Reier | |
| 4,490,253 A * | 12/1984 | Tafara | 210/238 |
| 4,585,833 A | 4/1986 | Domeier | |
| 4,612,150 A | 9/1986 | DeHowitt | |

(Continued)

FOREIGN PATENT DOCUMENTS

CN 1389604 1/2003

(Continued)

*Primary Examiner*—Walter D Griffin
*Assistant Examiner*—Amber Orlando

(57) ABSTRACT

This invention relates to a filter felt and bag filters comprising an intimate staple fiber blend of 20 to 75 parts by weight polymeric staple fiber containing a polymer or copolymer derived from a monomer selected from the group consisting of 4,4'diaminodiphenyl sulfone, 3,3'diaminodiphenyl sulfone, and mixtures thereof; and 25 to 80 parts by weight of a heat resistant staple fiber selected from the group consisting on meta-aramid fiber, acrylic fiber, polyphenylene sulfide fiber, and para-aramid fiber; based on 100 parts by weight of the polymeric fibers and heat resistant fibers in the felt.

17 Claims, 1 Drawing Sheet

U.S. PATENT DOCUMENTS

| | | | |
|---|---|---|---|
| 4,612,237 A * | 9/1986 | Frankenburg | 428/219 |
| 4,961,974 A * | 10/1990 | Jones | 428/34.2 |
| 5,053,482 A * | 10/1991 | Tietz | 528/272 |
| 5,393,601 A * | 2/1995 | Heinrich et al. | 442/411 |
| 5,468,537 A | 11/1995 | Brown et al. | |
| 5,667,743 A | 9/1997 | Tai et al. | |
| 5,677,031 A * | 10/1997 | Allan et al. | 428/137 |
| 6,110,243 A * | 8/2000 | Wnenchak et al. | 55/379 |
| 6,419,729 B1 * | 7/2002 | Duffy et al. | 96/17 |
| 2005/0274152 A1 * | 12/2005 | Koopmann et al. | 66/194 |
| 2008/0057807 A1 * | 3/2008 | Tutterow et al. | 442/1 |

FOREIGN PATENT DOCUMENTS

| | | |
|---|---|---|
| CN | 1631941 | 6/2005 |
| WO | WO 00/77283 | 12/2000 |

\* cited by examiner

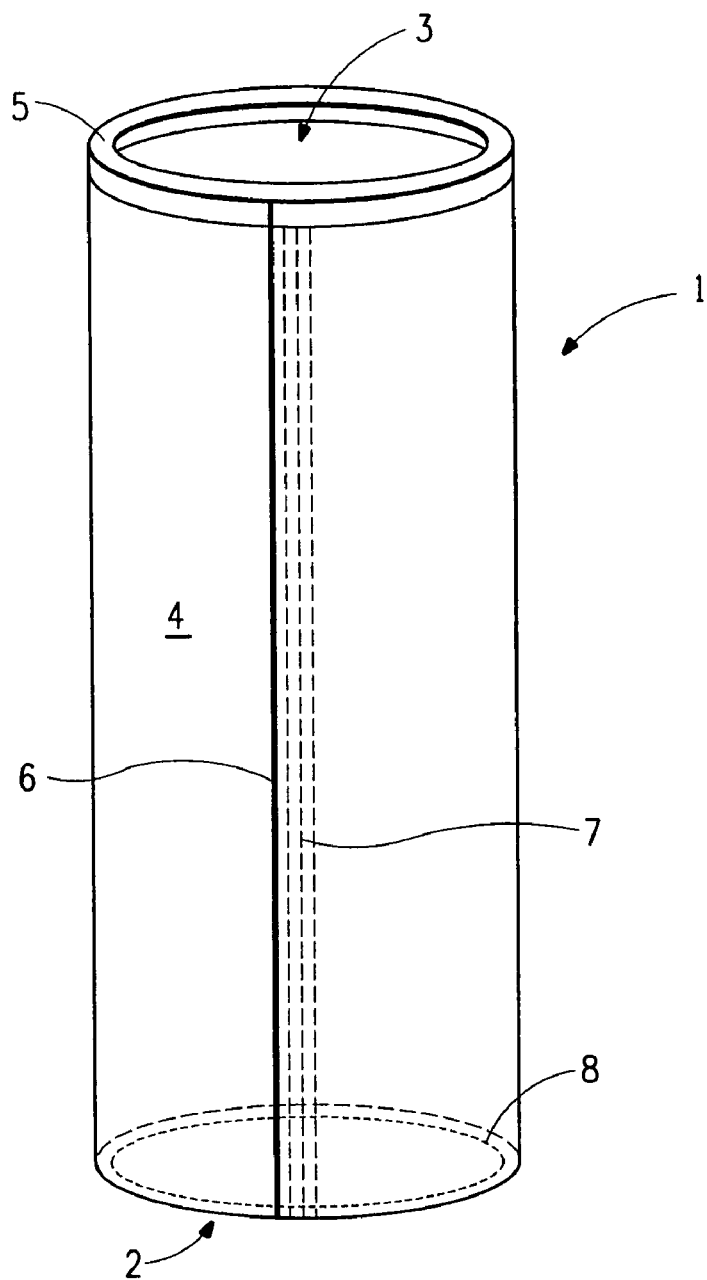
FIGURE

FILTER FELTS AND BAG FILTERS COMPRISING BLENDS OF FIBERS DERIVED FROM DIAMINO DIPHENYL SULFONE AND HEAT RESISTANT FIBERS

BACKGROUND OF INVENTION

1. Field of the Invention

This invention relates to filter felts and bag filters-having improved filtration performance. Such filter felts and bag filters are particularly useful in filtering hot gases, for example gases at temperatures of 150° C. or even higher. In one embodiment, the bag filters are particularly useful in asphalt plants to meet emission standards.

2. Description of Related Art

Filter felts and bag filters for hot gas filtration containing aramid staple fibers, such as disclosed in U.S. Pat. Nos. 4,100,323 and 4,117,578 to Forsten are known and are used to protect the environment from particulate matter from asphalt plants, coal plants, and other industrial concerns. Due to the high potential environmental impact from such plants and the extreme chemical environment the filters must endure, any improvement that has the potential to improve the durability, filtration efficiency, and/or chemical resistance, is desired.

BRIEF SUMMARY OF THE INVENTION

This invention relates to a filter felt comprising an intimate staple fiber blend of 20 to 75 parts by weight polymeric staple fiber containing a polymer or copolymer derived from a monomer selected from the group consisting of 4,4'diaminodiphenyl sulfone, 3,3'diaminodiphenyl sulfone, and mixtures thereof; and 25 to 80 parts by weight of a heat resistant staple fiber selected from the group consisting on meta-aramid fiber, acrylic fiber, polyphenylene sulfide fiber, and para-aramid fiber; based on 100 parts by weight of the polymeric fibers and heat resistant fibers in the felt. This invention also relates to bag filters made from such filter felts.

BRIEF DESCRIPTION OF THE DRAWINGS

The FIGURE illustrates one embodiment of the bag filter comprising a filter felt.

DETAILED DESCRIPTION OF THE INVENTION

In one embodiment, this invention concerns a filter felt and bag filter made from a polymeric staple staple fiber derived from a diaminodiphenyl sulfone monomer and a heat resistant staple fiber selected from the group consisting on meta-aramid fiber, acrylic fiber, polyphenylene sulfide fiber, and para-aramid fiber. A fiber known as polysulfonamide fiber (PSA) is made from a poly (sulfone-amide) polymer and has good thermal resistance due to its aromatic content and also has low modulus, which imparts more flexibility to fabrics made from the fiber; however, the fiber has low tensile break strength. This low fiber tensile strength has a major impact on the mechanical properties of fabrics made from these fibers, which limits the ability to utilize this flexible fiber in many applications, such as in protective apparel fabrics. However, it has been found that filtration felts made with PSA fiber blends surprisingly show no loss in filtration efficiency with significantly lower pressure drop and longer cycle time. This offers potential for longer bag life and lower operating cost.

The FIGURE illustrates one embodiment of the filter bag. Filter bag 1 has a closed end 2, an open end 3, and a tubular section 4. In the embodiment represented, the filter bag also has a spring steel metal snap ring 5 attached to the open end of the bag. The tubular section 4 of this bag is comprised of a filtration felt that is overlapped, forming a seam 6 sewn with triple stitching 7. The closed end of the bag in this embodiment is also comprised of a filtration felt that is stitched at 8 to the end of the felt used for the tubular section. While the FIGURE represents a preferred embodiment, other potential constructions, orientations, and features of bag filters may be used, such as those disclosed in U.S. Pat. Nos. 3,524,304 to Wittemeier et al.; U.S. Pat. No. 4,056,374 to Hixenbaugh; U.S. Pat. No. 4,310,336 to Peterson; U.S. Pat. No. 4,481,022 to Reier; U.S. Pat. No. 4,490,253 to Tafara; and/or U.S. Pat. No. 4,585,833 to Tafara.

In some embodiments the closed end 2 of the filter bag, as shown in the FIGURE, is a disk of filter felt sewn to the tubular section. In some other embodiments the closed end can be made of some other material, for example in some situations a metallic closed end might be needed. In other embodiments the closed end can be ultrasonically, adhesively, or heat seamed or sealed in some other manner than sewing. In another embodiment the felt used in the tubular section of the bag can be gathered together or folded, and then sealed, to form the closed end. In some embodiments the open end 3 of the bag may be provided with hardware to attach the bag to the cell plate. In some other embodiments the open end of the bag may be sized such that a snug fit is accomplished by sliding the bag over a specially designed cell plate.

The filtration felt can be made by nonwoven sheet forming processes, including processes for making air-laid nonwovens, wet-laid nonwovens, or nonwovens made from carding equipment; and such formed sheets can be consolidated into fabrics via spunlacing, hydrolacing, needlepunching, or other processes which can generate a nonwoven sheet. The spunlaced processes disclosed in U.S. Pat. Nos. 3,508,308 and 3,797,074; and the needlepunching processes disclosed in U.S. Pat. Nos. 2,910,763 and 3,684,284 are examples of methods known in the art that are useful in the manufacture of the nonwoven fabrics and felt.

In some preferred embodiments the nonwoven felt is a needledpunched felt; in some other preferred embodiments the nonwoven felt is a spunlaced felt. The basis weight of the felt is typically 8 to 16 ounces per square yard (270 to 540 grams per square meter), and in one preferred embodiment is 12 to 14 ounces per square yard (400 to 480 grams per square meter).

In some embodiments the tubular section 4 and optionally the closed end 2 of the filter bag is a single layer of filtration felt. In some other embodiments the tubular section is made of a filtration felt supported by a scrim or reinforcing cloth that provides stability during pulsing of the bag. In some preferred embodiments the nonwoven felt includes a supporting woven scrim that is made with fibers that are compatible with the staple fibers in the felt. One type of this felt can be made using standard carding and cross lapping equipment to convert staple fibers into crosslapped batts having basis weights of 4 to 8 ounces per square yard (135 to 270 grams per square meter) preferably 6 ounces per square yard (200 grams per square meter). If desired the batts can then be tacked or lightly consolidated, for example, on a standard needle punch machine. Two or more of these batts can then be positioned on either side of a woven scrim having a basis weight of 1 to 4 ounces per square yard (34 to 135 grams per square meter) preferably 2 ounces per square yard (70 grams per square meter), and the three layers are needled punched several times on both sides to produce filtration felts. In some preferred embodiments the woven scrim comprises polyphenylene sulfide fibers, para- or meta-aramid fibers, glass fibers, acrylic fibers or mixtures thereof.

In a preferred embodiment shown in the FIGURE the filtration felt is overlapped to form a cylinder of filter material having a seam 6 that is then stitched with a high temperature thread, such as a thread having 3 to 6 strand plies of meta-aramid fiber, para-aramid fiber, fluoropolymer fiber, glass fiber, or combinations or blends thereof. In other embodiments, the overlapped seam can be sealed by ultrasonics, adhesives, heat, or some combination of all these seaming methods.

One feature of the bag filter is that it includes a nonwoven felt comprising an intimate staple fiber blend 20 to 75 parts by weight polymeric staple fiber containing a polymer or copolymer derived from a monomer selected from the group consisting of 4,4'diaminodiphenyl sulfone, 3,3'diaminodiphenyl sulfone, and mixtures thereof; and 25 to 80 parts by weight of a heat resistant staple fiber selected from the group consisting on meta-aramid fiber, acrylic fiber, polyphenylene sulfide fiber, and para-aramid fiber; based on the total weight of the polymeric fibers and heat resistant fibers in the felt. In a preferred embodiment the polymeric staple fiber containing a polymer or copolymer derived from a monomer selected from the group consisting of 4,4'diaminodiphenyl sulfone, 3,3'diaminodiphenyl sulfone, and mixtures thereof is present in the intimate blend in an amount of 50 to 70 parts by weight. In another preferred embodiment, the heat resistant staple fiber is present in the intimate blend in an amount of 30 to 50 parts by weight. The staple fibers are disposed in the felt as an intimate blend, meaning that the types of staple fibers are uniformly mixed and distributed in the felt. This forms a uniform mixture in the felt so as to avoid any localized areas having a high concentration of any one type of fiber in any one portion of the felt.

The intimate staple fiber blend can be formed by many methods. For example, in one embodiment, clumps of crimped staple fibers obtained from bales of different types of staple fiber can opened by a device such as a picker and then blended by any available method, such as air conveying, to form a more uniform mixture. In an alternative embodiment, the staple fibers can be blended to form a mixture prior to fiber opening in the picker. In still another possible embodiment the staple fibers may be cutter blended, that is, tows of the various fiber types can be combined and then cut into staple. The blend of fibers can then be converted into a nonwoven felt. In one embodiment, this involves forming a fibrous web by use of a device such as a card, although other methods, such as air-laying or wet-laying of the fibers may be used. If desired the fibrous web can then be sent via conveyor to a device such as a crosslapper to create a crosslapped structure by layering individual webs on top of one another in a zig-zig structure.

In some embodiments, both the polymeric fiber derived from a diphenyl diamino sulfone monomer and the heat resistant fiber has a linear density of from 1.5 to 3 denier per filament (1.7 to 3.3 dtex per filament). In one preferred embodiment, the linear density of the heat resistant fiber is greater than 1.8 denier per filament (2.0 dtex per filament) up to 2.2 denier per filament (2.4 dtex per filament). The staple fibers used preferably have a cut length of 1.5 to 3 inches (38 to 76 mm) and are crimped, having a crimp frequency of 4 to 10 crimps per inch (1.5 to 4 crimps per centimeter).

By polymeric staple fibers containing a polymer or copolymer derived from an amine monomer selected from the group consisting of 4,4'diaminodiphenyl sulfone, 3,3'diaminodiphenyl sulfone, and mixtures thereof, it is meant the polymer fibers were made from a monomer generally having the structure:

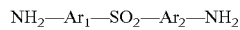
$$NH_2—Ar_1—SO_2—Ar_2—NH_2$$

wherein $Ar_1$ and $Ar_2$ are any unsubstituted or substituted six-membered aromatic group of carbon atoms and $Ar_1$ and $Ar_2$ can be the same or different. In some preferred embodiments $Ar_1$ and $Ar_2$ are the same. Still more preferably, the six-membered aromatic group of carbon atoms has meta- or para-oriented linkages versus the $SO_2$ group. This monomer or multiple monomers having this general structure are reacted with an acid monomer in a compatible solvent to create a polymer. Useful acids monomers generally have the structure of

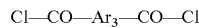
$$Cl—CO—Ar_3—CO—Cl$$

wherein $Ar_3$ is any unsubstituted or substituted aromatic ring structure and can be the same or different from $Ar_1$ and/or $Ar_2$. In some preferred embodiments $Ar_3$ is a six-membered aromatic group of carbon atoms. Still more preferably, the six-membered aromatic group of carbon atoms has meta- or para-oriented linkages. In some preferred embodiments $Ar_1$ and $Ar_2$ are the same and $Ar_3$ is different from both $Ar_1$ and $Ar_2$. For example, $Ar_1$ and $Ar_2$ can be both benzene rings having meta-oriented linkages while $Ar_3$ can be a benzene ring having para-oriented linkages. Examples of useful monomers include terephthaloyl chloride, isophthaloyl chloride, and the like. In some preferred embodiments, the acid is terephthaloyl chloride or its mixture with isophthaloyl chloride and the amine monomer is 4,4'diaminodiphenyl sulfone. In some other preferred embodiments, the amine monomer is a mixture of 4,4'diaminodiphenyl sulfone and 3,3'diaminodiphenyl sulfone in a weight ratio of 3:1, which creates a fiber made from a copolymer having both sulfone monomers.

In still another preferred embodiment, the polymeric staple fibers contain a copolymer, the copolymer having both repeat units derived from sulfone amine monomer and an amine monomer derived from paraphenylene diamine and/or metaphenylene diamine. In some preferred embodiments the sulfone amide repeat units are present in a weight ratio of 3:1 to other amide repeat units. In some embodiments, at least 80 mole percent of the amine monomers is a sulfone amine monomer or a mixture of sulfone amine monomers. For convenience, herein the abbreviation "PSA" will be used to represent all of the entire classes of fibers made with polymer or copolymer derived from sulfone monomers as previously described.

In one embodiment, the polymer and copolymer derived from a sulfone monomer can preferably be made via polycondensation of one or more types of diamine monomer with one or more types of chloride monomers in a dialkyl amide solvent suchs as N-methyl pyrrolidone, dimethyl acetamide, or mixtures thereof. In some embodiments of the polymerizations of this type an inorganic salt such as lithium chloride or calcium chloride is also present. If desired the polymer can be isolated by precipitation with non-solvent such as water, neutralized, washed, and dried. The polymer can also be made via interfacial polymerization which produces polymer powder directly that can then be dissolved in a solvent for fiber production.

The polymer or copolymer can be spun into fibers via solution spinning, using a solution of the polymer or copolymer in either the polymerization solvent or another solvent for the polymer or copolymer. Fiber spinning can be accomplished through a multi-hole spinneret by dry spinning, wet spinning, or dry-jet wet spinning (also known as air-gap spinning) to create a multi-filament yarn or tow as is known in the art. The fibers in the multi-filament yarn or tow after spinning can then be treated to neutralize, wash, dry, or heat treat the fibers as needed using conventional technique to make stable and useful fibers. Exemplary dry, wet, and dry-jet wet spinning processes are disclosed U.S. Pat. Nos. 3,063,966; 3,227,793; 3,287,324; 3,414,645; 3,869,430; 3,869,429; 3,767,756; and 5,667,743.

Specific methods of making PSA fibers or copolymers containing sulfone amine monomers are disclosed in Chinese Patent Publication 1389604A to Wang et al. This reference discloses a fiber known as polysulfonamide fiber (PSA) made by spinning a copolymer solution formed from a mixture of 50 to 95 weight percent 4,4'diaminodiphenyl sulfone and 5 to 50 weight percent 3,3'diaminodiphenyl sulfone copolymerized with equimolar amounts of terephthaloyl chloride in dimethylacetamide. Chinese Patent Publication 1631941A to Chen et al. also discloses a method of preparing a PSA copolymer spinning solution formed from a mixture of 4,4'diaminodiphenyl sulfone and 3,3'diaminodiphenyl sulfone in a mass ratio of from 10:90 to 90:10 copolymerized with equimolar amounts of terephthaloyl chloride in dimethylacetamide. Still another method of producing copolymers is disclosed in U.S. Pat. No. 4,169,932 to Sokolov et al. This reference discloses preparation of poly(paraphenylene) terephthalamide (PPD-T) copolymers using tertiary amines to increase the rate of polycondensation. This patent also discloses the PPD-T copolymer can be made by replacing 5 to 50 mole percent of the paraphenylene diamine (PPD) by another aromatic diamine such as 4,4'diaminodiphenyl sulfone.

The heat resistant staple fiber is selected from the group consisting of meta-aramid fiber, acrylic fiber, polyphenylene sulfide fiber, and para-aramid fiber. In some preferred embodiments the heat resistant fiber has a break tenacity greater than the break tenacity of the PSA staple fiber, which is generally 3 grams per denier (2.7 grams per dtex) and low tensile moduli of 30 to 60 grams per denier (27 to 55 grams per dtex). In some embodiments, the heat resistant fiber has a break tenacity of at least 3.5 grams per denier (3.2 grams per dtex). In some other embodiments the heat resistant fiber has a break tenacity of at least 4 grams per denier (3.6 grams per dtex) or greater. The addition of the higher tenacity heat resistant staple fiber is believed to translate into improved strength and durability in the final filtration felts and filter bags made from the blend of staple fibers.

It is believed that the addition of a relatively higher strength heat resistant staple fiber in amounts as little as 25 percent by weight can contribute to increased felt strength. In some other embodiments, it is believed that the addition of relatively higher strength and higher modulus textile staple fiber in amounts greater than 30 percent up to 50 percent by weight can provide a preferred felt for use in filter bag. In some especially preferred filtration felts and bags the polymeric or PSA staple fiber is combined with higher tensile strength and higher modulus polymetaphenylene isophthalamide staple fiber. Such a felt has lower stiffness and therefore is more flexible than a felt made totally from higher amounts of the polymetaphenylene isophthalamide staple fiber. Both the polymetaphenylene isophthalamide and PSA fibers have high flame retardancy, therefore, the combination of a lower strength but highly flexible PSA fiber with a higher strength and higher modulus polymetaphenylene isophthalamide fiber will ensure the resulting filtration felt has adequate thermal performance.

The meta-aramid fiber includes meta-oriented synthetic aromatic polyamide polymers. The polymers can include polyamide homopolymers, copolymers, and mixtures thereof which are predominantly aromatic, wherein at least 85% of the amide (—CONH—) linkages are attached directly to two aromatic rings. The rings can be unsubstituted or substituted. The polymers are meta-aramid when the two rings or radicals are meta oriented with respect to each other along the molecular chain. Preferably copolymers have no more than 10 percent of other diamines substituted for a primary diamine used in forming the polymer or no more than 10 percent of other diacid chlorides substituted for a primary diacid chloride used in forming the polymer. Additives can be used with the aramid; and it has been found that up to as much as 13 percent by weight of other polymeric material can be blended or bonded with the aramid. The preferred meta-aramids are poly(metaphenylene isophthalamide) (MPD-I) and its copolymers. One such meta-aramid fiber is Nomex® aramid fiber available from E. I. du Pont de Nemours and Company of Wilmington, Del., however, meta-aramid fibers are available in various styles under the trademarks Conex®, available from Teijin Ltd. of Tokyo, Japan,; Apyeil®, available from Unitika, Ltd. of Osaka, Japan; New Star® Meta-aramid, available from Yantai Spandex Co. Ltd, of Shandong Province, China; and Chinfunex® Aramid 1313 available from Guangdong Charming Chemical Co. Ltd., of Xinhui in Guangdong, China. Meta-aramid fibers are inherently flame resistant and can be spun by dry or wet spinning using any number of processes; however, U.S. Pat. Nos. 3,063,966; 3,227,793; 3,287,324; 3,414,645; and 5,667,743 are illustrative of useful methods for making aramid fibers that could be used.

The acrylic fiber includes acrylonitrile units which are at least 85 wt % of the total acrylic fiber. An acrylonitrile unit is —(CH2-CHCN)—. The acrylic fiber can be made from acrylic polymers made up of 85% by weight or more of acrylonitrile with 15% by weight or less of an ethylenic monomer copolymerizable with acrylonitrile and mixtures of two or more of these acrylic polymers. Examples of the ethylenic monomer copolymerizable with acylonitrile include acylic acid, methacrylic acid and esters thereof (methyl acrylate, ethyl acrylate, methyl methacylate, ethyl methacrylate, etc.), vinyl acetate, vinyl chloride, vinylidene chloride, acrylamide, methacylamide, methacrylonitrile, allylsulfonic acid, methanesulfonic acid and styrenesulfonic acid. One illustrative method of making acrylic polymers and fibers is disclosed in U.S. Pat. No. 3,047,455. Acrylic fibers have been commercially manufactured by a number of companies including Solutia, Inc. and Bayer Inc.; one particularly preferred acrylic fiber is commercially available from Sterling Fibers, Inc. of Pace, Fla. It is preferred that staple fiber blends containing acrylic staple fibers contain 30 weight percent or less of those acrylic staple fibers due to their lower long-term heat stability.

Polyphenylene sulfide fiber has good heat resistance, chemical resistance, and hydrolysis resistance. At least 90% of the constituent units of these fibers are of a polymer or copolymer having phenylene sulfide structural units of —($C_6H_4$—S)—. Polyphenylene sulfide fiber is sold under the tradenames Ryton® by American Fibers and Fabrics, Toray PPS® by Toray Industries Inc., Fortron® by Kureha Chemical Industry Co. and Procon® by Toyobo Co.

Para-aramid fibers are made from an aramid polymer wherein the two rings or radicals are para oriented with respect to each other along the molecular chain. As is the case with meta-aramid fibers, additives can be used and it has been found that up to as much as 10 percent, by weight, of other polymeric material can be blended with the aramid or that copolymers can be used having as much as 10 percent of other diamine substituted for the diamine of the aramid or as much as 10 percent of other diacid chloride substituted for the diacid chloride of the aramid. In the practice of this invention, the preferred para-aramid is poly(paraphenylene terephthalamide). Methods for making para-aramid fibers are generally disclosed in, for example, U.S. Pat. Nos. 3,869,430; 3,869,429; and 3,767,756. Such aromatic polyamide organic fibers and various forms of these fibers are available from E. I. du Pont de Nemours & Company, Wilmington, Del. sold under the trademark Kevlar® fibers and from Teijin Ltd. of Japan sold under the trademark Twaron® fibers. For the purposes herein, Technora® fiber, which is available from Teijin Ltd. of Tokyo, Japan, and is made from copoly(p-phenylene/3, 4'diphenyl ester terephthalamide), is considered a para-aramid fiber.

Test Methods

Filtration efficiency was measured using VDI 3926. In VDI 3926, filtration efficiency (also called dust leakage) is measured in milligram per cubic meter ($mg/m^3$), pressure drop is measured in Pascal (Pa) and cycle time is measured in seconds. Filtration efficiency represents the amount of dust passing through the filter. The pressure drop is the differential pressure between 2 pulses to release the dust cake. When a certain pressure drop is obtained (in VDI 3926 the maximum pressure drop is set at 1000 Pa) a reverse flow is automatically created. The VDI 3926 is based on an initial cycles, followed by 10,000 cycles to simulate filter aging, and finally another 30 cycles. The filtration efficiency, pressure drop and cycle time are measured at the end of the final 30 cycles.

EXAMPLES

The invention is illustrated by, but is not intended to be limited by the following examples. All parts and percentages are by weight unless otherwise indicated:

Example 1

An intimate staple fiber blend containing 30 parts by weight of a 2 denier per filament (2.2 dtex per filament) meta-aramid fiber having a 2 inch (50 mm) cut length (available under the trademark Nomex® fiber from E. I. du Pont de Nemours and Company, Wilmington Del.) and 70 parts by weight of a ~1.7 denier per filament (2 dtex per filament) PSA fiber having a 1.8 inch (50 mm) cut length (available under the trademark Tanlon® from Shanghai Tanlon Fiber Co, Ltd.) was made by combining and mixing the staple fibers from bales. Using standard carding and cross lapping equipment these staple fibers were converted into crosslapped batts and they were then tacked or lightly consolidated on a standard needle punch machine. Two of these batts were then combined and needle-punched several times on both sides to produce a filtration felt. As a comparison, and using the same procedure as above, a layered felt containing two batts of 100 percent 2 denier per filament (2.2 dtex per filament) Nomex® meta-aramid fiber was prepared. Both felts were then evaluated for filtration efficiency using the procedure VDI 3926. The filtration felts made from the 30/70% m-aramid/PSA staple fiber blend easily passed the EPA emission limits for an asphalt plant. In addition, the performance of the filtration felt made from the 30/70% m-aramid/PSA staple fiber blend had superior performance when compared to the 100% meta-aramid structure, as shown in the Table. The addition of PSA staple fibers surprisingly shows no loss in filtration efficiency with significantly lower pressure drop and longer cycle time. This offers potential for longer bag life and lower operating cost.

Example 2

Example 1 was repeated, except the intimate staple fiber blend contained 50 parts by weight of the same meta-aramid staple fiber and 50 parts by weight of the same PSA staple fiber. The filtration felt made from the m-aramid/PSA staple fiber blend again had superior performance when compared to the 100% meta-aramid structure, as shown in the Table. In addition, this example shows the felt made from the m-aramid/PSA staple fiber blend had a lower pressure drop even though the felt had a higher basis weight.

TABLE 1

| Property | Control | Example 1 | Example 2 |
|---|---|---|---|
| Composition | 100% m-aramid | 30/70% m-aramid/PSA | 50/50% m-aramid/PSA |
| Dust Leakage, $mg/m^3$ | 2.08 | 1.6 | 0.41 |
| Basis Weight, $g/m^2$ | 355 | 343 | 399 |
| Pressure Drop, Pa | 430 | 200 | 209 |
| Cycle Time, sec | 70 | 157 | 162 |

Example 3

Filter bags are made from the felts of Example 1 by cutting the felts such that when assembled as in the FIGURE the filter bags have a tubular section that is approximately 120 inches (305 cm) long and has a 7 inch (18 cm) double flat width. The felts are sewn together with triple-stitching at the seams on the side of the tubular section and to attach the end section of the bag. A 5 inch (13 cm) snap ring top is then attached to the open end of the bag. The bags then used to filter asphalt plant dust particles in a pulse-jet bag house.

What is claimed is:

1. A bag filter containing a filter felt the bag filter having a tubular section, one closed end and one open end, wherein the filter felt is a nonwoven felt and forms at least the tubular section of the bag filter,
   wherein the filter felt comprises an intimate staple fiber blend of
   a) 20 to 75 parts by weight polymeric staple fiber of a polymer or copolymer consisting of sulfone amine monomer reacted with at least one acid monomer, the sulfone amine monomer selected from the group consisting of 4,4' diaminodiphenyl sulfone, 3,3' diaminodiphenyl sulfone, and mixtures thereof; and
   b) 25 to 80 parts by weight of a heat resistant staple fiber selected from the group consisting of meta-aramid fiber, acrylic fiber, polyphenylene sulfide fiber, and para-aramid fiber; based on the 100 parts by weight of the polymeric fibers and heat resistant fibers in the felt.

2. The bag filter of claim 1 wherein the polymeric staple of the filter felt fiber is present in an amount of 50 to 70 parts by weight.

3. The bag filter of claim 1 wherein the heat resistant staple fiber of the filter felt is present in an amount of 30 to 50 parts by weight.

4. The bag filter of claim 1 wherein the filter felt is in the form of a needlepunched felt.

5. The bag filter of claim 1 wherein the filter felt is in the form of a spunlaced felt.

6. The bag filter of claim 1 wherein the denier per filament of the polymeric staple fiber or the heat resistant staple fiber of the filter felt is from 1.5 to 3.0 (1.7 to 3.3 dtex per filament).

7. The bag filter of claim 1 having a basis weight of from 8 to 16 ounces per square yard (270 to 540 grams per square meter) for the filter felt.

8. The bag filter of claim 7 having a basis weight of from 12 to 14 ounces per square yard (400 to 480 grams per square meter) for the filter felt.

9. A bag filter containing a filter felt the bag filter having a tubular section, one closed end and one open end, wherein the filter felt is a nonwoven felt and forms at least the tubular section of the bag filter, wherein the filter felt comprises an intimate staple fiber blend of a) 20 to 75 parts by weight polymeric staple fiber of a polymer or copolymer consisting of a mixture of sulfone amine monomer and aromatic amine monomer reacted with at least one acid monomer, the sulfone amine monomer selected from the group consisting of 4,4' diaminodiphenyl sulfone, 3,3' diaminodiphenyl sulfone, and mixtures thereof;

the aromatic amine monomer selected from the group consisting of paraphenylene diamine, metaphenylene diamine, and mixtures thereof; and b) 25 to 80 parts by weight of a heat resistant staple fiber selected from the group consisting of meta-aramid fiber, acrylic fiber, polyphenylene sulfide fiber, and para-aramid fiber; based on the 100 parts by weight of the polymeric fibers and heat resistant fibers in the felt.

10. The bag filter of claim 9 wherein at least 80 mole percent of the polymer or copolymer used in the polymeric staple fiber is derived from the sulfone amine monomer in the filter felt.

11. The bag filter of claim 9 wherein the polymeric staple fiber is present in an amount of 50 to 70 parts by weight in the filter felt.

12. The bag filter of claim 9 wherein the heat resistant staple fiber is present in an amount of 30 to 50 parts by weight in the filter felt.

13. The bag filter of claim 9 wherein the filter felt is in the form of a needlepunched felt.

14. The filter felt bag filter of claim 9 wherein the filter felt is in the form of a spunlaced felt.

15. The bag filter of claim 9 wherein the denier per filament of the polymeric staple fiber or the heat resistant staple fiber is from 1.5 to 3.0 (1.7 to 3.3 dtex per filament) of the filter felt.

16. The bag filter of claim 9 having a basis weight of from 8 to 16 ounces per square yard (270 to 540 grams per square meter) of the filter felt.

17. The bag filter of claim 16 having a basis weight of from 12 to 14 ounces per square yard (400 to 480 grams per square meter) of the filter felt.

* * * * *